(12) United States Patent
Bourgund et al.

(10) Patent No.: US 11,246,448 B2
(45) Date of Patent: *Feb. 15, 2022

(54) LIQUID DISPENSING MACHINE WITH DROP STOP

(71) Applicant: SOCIÉTÉ DES PRODUITS NESTLÉ S.A., Vevey (CH)

(72) Inventors: Herve Bourgund, Lyons (FR); Luc Fontbonne, Lyons (FR); Blaise Rithener, La Tour-de-Peilz (CH); Pierre-Emmanuel Vincent, Corbas (FR)

(73) Assignee: Societe des Produits Nestle S.A., Vevey (CH)

( * ) Notice: Subject to any disclaimer, the term of this patent is extended or adjusted under 35 U.S.C. 154(b) by 290 days.

This patent is subject to a terminal disclaimer.

(21) Appl. No.: 16/339,472

(22) PCT Filed: Oct. 10, 2017

(86) PCT No.: PCT/EP2017/075724
§ 371 (c)(1),
(2) Date: Apr. 4, 2019

(87) PCT Pub. No.: WO2018/069266
PCT Pub. Date: Apr. 19, 2018

(65) Prior Publication Data
US 2020/0037810 A1    Feb. 6, 2020

(30) Foreign Application Priority Data

Oct. 11, 2016 (EP) ..................... 16193320

(51) Int. Cl.
*A47J 31/46*    (2006.01)
*A47J 31/36*    (2006.01)

(52) U.S. Cl.
CPC ........... *A47J 31/46* (2013.01); *A47J 31/3633* (2013.01)

(58) Field of Classification Search
CPC ...................................... A47J 31/46
See application file for complete search history.

(56) References Cited

U.S. PATENT DOCUMENTS

| 5,896,806 A * | 4/1999 | Dal Tio | A47J 31/3657 |
| | | | 99/289 T |
| 2006/0186134 A1 * | 8/2006 | Medema | A47J 31/0668 |
| | | | 222/21 |

(Continued)

FOREIGN PATENT DOCUMENTS

| CN | 101692961 | 4/2010 |
| CN | 104771075 A | 7/2015 |

(Continued)

*Primary Examiner* — John J Norton
(74) *Attorney, Agent, or Firm* — K&L Gates LLP

(57) ABSTRACT

A machine (1) for dispensing a beverage (7) includes a module (10) having a cavity (10a) and a cavity outlet (10a') for guiding said beverage out of the cavity (10a). The cavity (10a) is delimited by a first module part (11) and a second module part (12). At least one (11) of the parts (11, 12) is movable along a module direction (10') into a position distant from the other part (12) for transferring an ingredient capsule (2) to and/or from the cavity (10a) and into a position close to the other part (12) for processing the capsule (2) in the cavity (10a) to form said beverage (7). The machine (1) includes a guide (100) that has a guide outlet (102) and that is movable between: a dispensing position for receiving the beverage (7) from the cavity outlet (10a') and guiding the beverage (7) along a guide direction (100') to the guide outlet (102) to a beverage dispensing area; and a non-dispensing position for preventing liquid from being guided to the dispensing area. The guide direction (100') is horizontally angled away from the module direction (10')

(Continued)

such as horizontally angled away by an angle in the range of 45 to 135 deg.

15 Claims, 2 Drawing Sheets

(56) References Cited

U.S. PATENT DOCUMENTS

| | | | |
|---|---|---|---|
| 2007/0251395 A1* | 11/2007 | Wu | A47J 31/10 |
| | | | 99/279 |
| 2012/0305111 A1 | 12/2012 | Peretti et al. | |
| 2013/0247773 A1 | 9/2013 | Kristlbauer | |
| 2015/0040771 A1* | 2/2015 | Mori | A47J 31/46 |
| | | | 99/295 |
| 2015/0257585 A1 | 9/2015 | Windler et al. | |
| 2017/0347826 A1* | 12/2017 | Popa | A23F 3/18 |

FOREIGN PATENT DOCUMENTS

| | | | | |
|---|---|---|---|---|
| CN | 105935249 A | 9/2016 | | |
| EP | 2565151 A1 * | 3/2013 | ............ | A47J 31/46 |
| WO | 2009043630 | 4/2009 | | |
| WO | 2012072758 | 6/2012 | | |
| WO | 2016050657 | 4/2016 | | |
| WO | 2016083488 | 6/2016 | | |
| WO | 2016156372 | 10/2016 | | |

* cited by examiner

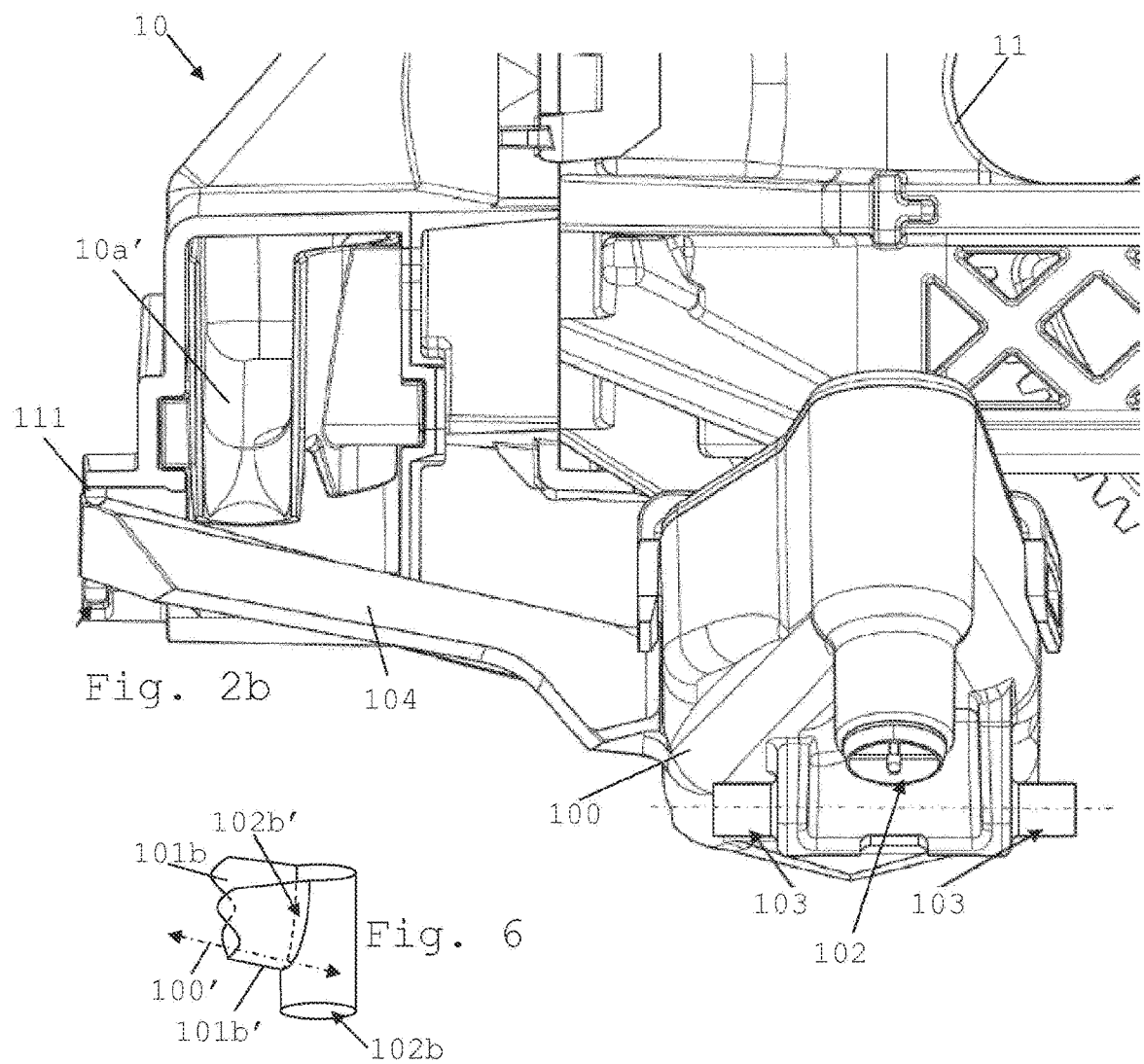
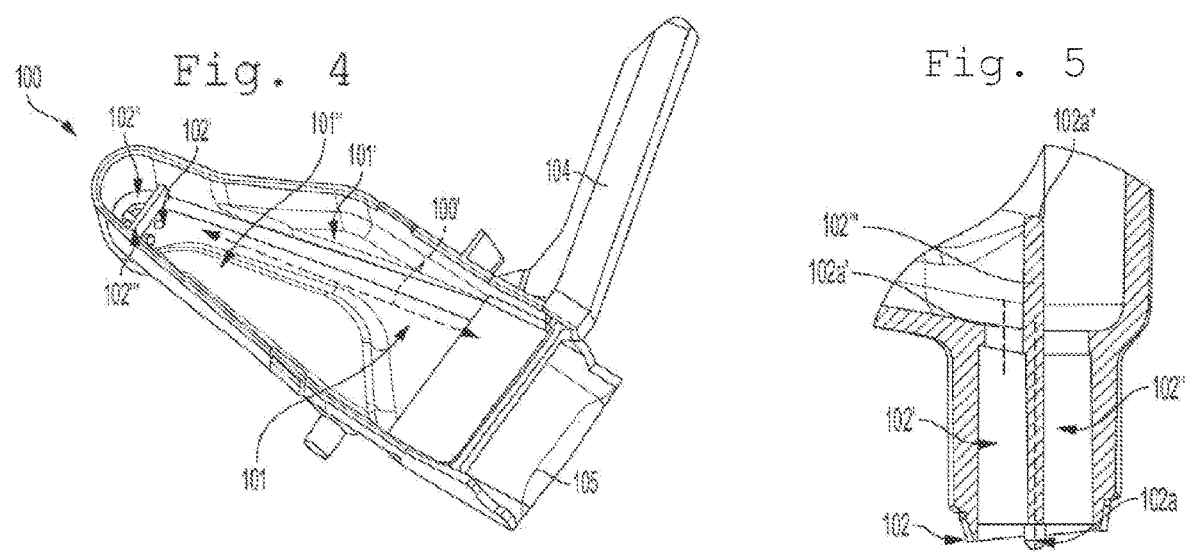

LIQUID DISPENSING MACHINE WITH DROP STOP

CROSS REFERENCE TO RELATED APPLICATIONS

The present application is a National Stage of International Application No. PCT/EP2017/075724, filed on Oct. 10, 2017, which claims priority to European Patent Application No. 16193320.5, filed on Oct. 11, 2016, the entire contents of which are being incorporated herein by reference.

FIELD OF THE INVENTION

The field of the invention pertains to machines dispensing a liquid such as a beverage, for instance using capsules of an ingredient of the beverage to be prepared, to a user-recipient in a dispensing area and an arrangement for preventing undesired dripping of liquid residues into the dispensing area, in particular after a liquid dispensing process (after a serving) and/or between liquid dispensing processes (between servings).

For the purpose of the present description, a "beverage" is meant to include any human-consumable liquid substance, such as tea, coffee, hot or cold chocolate, milk, soup, baby food, etc. A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a boiler, a thermoblock or the like, a brewing unit in which an ingredient is brewed with water or a mixing unit in which ingredients are mixed together, and a beverage outlet for dispensing the prepared beverage. Typically, the beverage outlet is located above a beverage dispensing zone, e.g. above a grid for supporting a cup or other recipient under the outlet and for the passage of drops of liquid from the beverage outlet or other spills into a collector tray located under the grid.

For example, EP 1 440 639 discloses a beverage machine comprising a receptacle stand having a hollow interior forming a drip tray. Drip tray devices with cup supports are well known in the art. There are also such devices that are further arranged for allowing the adjustment of the vertical position under the beverage outlet of cups of different sizes. Examples of arrangements in this field are disclosed in CA 2,260,352, EP 0 549 887, EP 1 731 065, EP 1 867 260, FR 2 439 042, U.S. Pat. Nos. 5,161,455, 5,353,692, WO 2009/074557.

WO 2012/072758 and WO 2013/127907 disclose beverage machines having a beverage guide located downstream an ingredient processing module that includes a first beverage path to a serving locating and a second beverage path to a service location. The module has a downstream part that is movable between an ingredient processing position and an ingredient insertion/evacuation position, the downstream part being coordinated with the beverage guide so that the beverage is directed to the service location when the downstream part in in the ingredient insertion/evacuation position and to the serving location when the downstream part is in the ingredient processing position. To reliably stop the dripping to the serving location at the end of the ingredient processing, the downstream part should be brought to the ingredient insertion/evacuation position at the end of beverage serving.

An alternative motorized beverage guide configuration is disclosed in EP2014186738.

WO 2006/050769 discloses a beverage preparation machine with a vertically movable cup support located under the machine's beverage outlet and a drop collector arm that is pivotable under the beverage outlet for collecting drops upon beverage dispensing. The drop collector is motorized and automatically moved away from the beverage outlet when a cup is detected under the outlet by a dedicated sensor and is moved back when the beverage processing is stopped. The electric motor of the collector is controlled by a controller connected to this cup sensor which controls also the beginning and a premature end of the beverage preparation and dispensing (due to an early removal of the cup). In an alternative embodiment, the drop collector is simply pushed out of the collecting position by a cup placed under the outlet and allowed back to the collecting position by the removal of the cup (mechanical cup sensor and drop stop actuation). In a further embodiment it is suggested to actuate the drop collector via the machine's pump hydraulically instead of electrically (coordination of the drop collector with the activity of the pump).

To avoid the use of a drop collector and corresponding actuation thereof between a collecting configuration and a dispensing configuration, it has been proposed in WO 2011/067264 to release the pressure upstream the beverage outlet and beverage preparation unit via a deviation valve so that evacuation of the residual pressurised liquid in the machine via the beverage outlet is minimised.

There is still an need to provide a system that prevents or inhibits the dispensing to a beverage dispensing area of undesired drops that allows implementation flexibility.

SUMMARY OF THE INVENTION

A preferred object of the invention is to address at least some of the drawbacks of the prior art beverage dispensing systems or at least to provide an alternative thereto.

The invention relates to a machine for dispensing a beverage.

The beverage machine can be an in-home or out of home machine. The beverage machine can be for the preparation of coffee, tea, chocolate, cacao, milk, soup, baby food, etc.

The beverage machine may be arranged for preparing within a beverage preparation module a beverage by passing hot or cold water or another liquid through a capsule containing an ingredient, such as a flavoring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a serving. The volume of such a serving may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. In particular, a coffee machine may be configured for dispensing espressos, e.g. an adjustable volume of 20 to 60 ml per serving, and/or for dispensing lungos, e.g. a volume in the range of 70 to 150 ml per serving.

The machine has an operative orientation for dispensing a beverage.

The machine may include a main or stationary frame and/or outside housing in which and/or to which the machine's components, e.g. the components mentioned below, are assembled. Exemplary beverage preparation architectures are for instance disclosed in WO 2009/074550 and WO 2009/130099.

The machine includes a module having a cavity and a cavity outlet for guiding the beverage out of the cavity. The cavity is delimited by a first module part and a second module part. At least one of the parts is movable along a module direction into a position distant from the other part for transferring an ingredient capsule to and/or from the cavity and into a position close to the other part for processing the capsule in the cavity to form the beverage. The other part can be stationary, for example.

Examples of capsules are disclosed in EP 0 512 468 and EP 0 512 470.

Examples of modules with cavities are disclosed in WO 2007/135135, WO 2009/043630 and WO 2011/042400.

The module can be configured to process a capsule containing the beverage ingredient that is mixed with the liquid to be dispensed. The module, e.g. the above chamber, may comprise or may be associated with at least one capsule opener, such as at least one of: one or more puncturing and/or tearing elements; and one or more pins and/or blades, such as a capsule piercer or tearing plate, e.g. as known from EP 0 512 468, EP 0 512 470, EP 1 299 022, EP 1 339 305, WO 2013/026845, WO 2014/076041, WO 2015/022342, WO 2015/022344 and WO 2015/022345.

The machine has a guide that includes a guide outlet and that is movable between:
- a dispensing position for receiving the beverage from the cavity outlet and guiding the beverage along a guide direction to the guide outlet and out thereof so as to be dispensed to a beverage dispensing area in which a user-recipient can be placed for collecting the beverage; and
- a non-dispensing position for preventing liquid, e.g. residual beverage or other waste liquid, from being guided out of the guide outlet to the dispensing area; for instance, when present, such liquid, e.g. residual beverage or other waste liquid may be evacuated to a service area.

The guide may be assembled to a machine's frame and/or outer or outside housing. For instance, the guide may be assembled to such a frame and/or housing, directly or indirectly, via a bearing system (e.g. a pivoting arrangement or a translational arrangement).

The dispensing area can be delimited by a receptacle support. Typically the support includes a support surface for positioning a user-recipient, e.g. a mug or a cup, to collect the dispensed beverage. The support surface may be formed by a support member that is part of the machine or may be a virtual surface, e.g. the surface of a table on which the machine is placed. Examples of such support surfaces for user-recipients are disclosed in EP 1 867 260, WO 2009/074557 and WO 2013/104636.

The service area may be delimited by a removable receptacle, e.g. located within a machine's frame and/or housing. The removable receptacle can be a waste collector, such as a waste material tank or reservoir. Examples of such collectors are disclosed in EP 1 867 260, WO 2009/074557, WO 2009/074559, WO 2009/135869, WO 2011/086087 and WO 2011/154492. Typically, the waste collector is configured for collecting at least one of: one or more waste beverage ingredients, such as a used flavouring ingredient and/or waste water; one or more used capsules for supplying a beverage ingredient into the machine; and a cleaning agent, such as a cleaning, rinsing or descaling liquid.

The guide can be located inside a machine frame and/or inside a machine housing, or projecting out of such frame and/or housing, or located entirely outside such frame and/or housing.

The service area can be configured for collecting collectable beverage, residues or other liquids from the module. For instance, the service area is associated with a removable collector such as a removable tank.

For instance, the module is assembled to a machine's frame and/or outer or outside housing. For example, a fixed part of the module, e.g. a fixed first part or a fixed second part or a fixed module frame carrying the first and second parts, is assembled to such a machine's frame and/or housing.

Typically, the beverage dispensing area is located below the guide and/or below the machine's dispensing outlet (when present) downstream the guide.

Normally, the beverage dispensing area is located along an outside face of the machine, e.g. a front face, of the dispensing machine.

The guide and/or the at least one of the parts can be moved by an actuator, e.g. a motor, such as an actuator connected to the guide and/or to the at least one of the parts via a mechanical transmission, e.g. comprising at least one of a worm drive, toothed wheel, toothed pinion and cam arrangement.

Suitable actuators are for example disclosed in WO 2006/050769, WO 2012/072758, WO 2013/127907 and EP2014186738.2.

The actuator may include at least one resilient element, such as a return spring.

Examples of module actuators and their control and transmissions can be found in EP 1 767 129, WO 2005/004683, WO 2007/135135, WO2007/135136, WO 2011/042400, WO 2011/042401, WO 2012/025258, WO 2012/025259, WO 2012/093108, WO 2014/056810, WO 2014/056862, WO 2014/096121, EP2014163793 and EP2014163810 and the references cited therein.

The guide direction is horizontally angled away from the module direction when the machine is in its operative orientation, such as horizontally angled away by an angle in the range of 45 to 135 deg., such as 60 to 120 deg., for instance 75 to 105 deg., for example 85 to 95 deg., e.g. an angle of about 90 deg.

"Horizontally angled away" refers to the horizontal angular component of the angle between the guide direction and the module direction. Of course, this angle may also include a vertical component which component is not considered in the horizontal angular component of the angle, i.e. the guide direction and/or the module direction can but do not need to be in a horizontal plane. For instance, the guide direction includes a vertical component to favour the flow of liquid, i.e. the guide direction slopes downwards (in addition to being horizontally angled away from the module direction), such as sloping downwards by an angle of 2 to 80 deg., for example 3 to 60 deg. such as 5 to 45 deg., e.g. 10 to 30 deg.

Hence, the module may be mounted along one direction in the machine and the machine's outlet (dispensing beverage to a dispensing area for placing a user-receptacle) may be on a machine face in a manner that does not follow the orientation of the module's direction.

In the operative orientation, the module direction may extend in a module vertical plane, the guiding direction extending in a guide vertical plane that is at the above mentioned horizontal angle relative to the module vertical plane.

In the operative orientation, the cavity outlet can have a cavity outlet direction along which the beverage is guided out thereof, the cavity outlet direction being at a further horizontal angle to the module direction. For instance, the further horizontal angle is equal or substantially equal to the horizontal angle.

The at least one of the module parts, when moved between the distant and the close positions, may actuate the guide between the dispensing and the non-dispensing positions. For instance, the at least one of the parts has a part member, e.g. a cam, that acts between the distant and the close positions in a relatively sliding or rolling movement on the guide to actuate it.

The guide can have a member, such as a cam-follower, which is actuated to move the guide between the dispensing and the non-dispensing positions. The guide member may be actuated by the at least one of the module parts when moved between the distant and the close positions. Typically, the guide is moved in a direction that is different to the module direction.

The guide can be translationally and/or rotationally movable between the dispensing and the non-dispensing positions. For instance, the guide is pivotally mounted along a pivoting axis.

The guide can have a guide channel extending along the guide direction for receiving the beverage from the cavity outlet and for guiding the beverage to the guide outlet, the guide channel having a cross-section orthogonal to the guide direction and a bottom generally extending along the guide direction, the cross-section having a width that increases with distance from the bottom, e.g. with height above the bottom. The higher in the guide the wider the cross-section over the bottom.

Hence, when beverage is dispensed from the machine at a small flow rate, the flow section in the guide channel is small so as to increase the beverage speed whereas when the beverage is dispensed at a high flow rate, the flow section in the guide channel is large so as to reduce the beverage speed. Hence a beverage dispensed at a small flow rate may be dispensed at a speed that is substantially the same or similar to the speed of a beverage dispensed at a high flow rate. It follows that such a channel has a beverage speed regulating effect.

Such a configuration may be used to provide a sufficient height of beverage in the guide which can be used to prevent that large surface bubbles reach the bottom of the guide and are dispensed as such from the guide's outlet. On the contrary, such large bubbles remain at the surface of the beverage within the guide until they pop rather than being dispensed.

This effect can also be used to control the crema formation when the machine is a coffee machine, e.g. used to dispensed at least two of ristrettos, expressos, lungos and americanos.

The guide channel may extend in a generally, symmetrical or asymmetrical, U-shape or V-shape or stepped-shape in cross-section orthogonal to the guide direction and along substantially the entire bottom or along a predominant part thereof.

For instance, the guide channel is stepped in cross-section. The bottom may form a lower bottom at a bottom level, the guide channel having at least one upper bottom at an upper level above the lower level so that the guide channel has:
 a narrow cross-section extending from above the lower level to the upper level for guiding a small flow of beverage along the guide channel; and
 a wider section extending from above the upper level for guiding a greater flow of beverage along the guide channel.

Optionally the guide channel has a further upper bottom at a further upper level above said upper level so that the guide channel has an even wider cross-section extending from above the further upper level for guiding an even greater flow of beverage along the guide channel.

The distance between two levels, i.e. between the lower and the upper level, and optionally when present between the upper level and the further upper level, may be in the range of 1 to 6 mm such as 2 to 4 mm.

The guide channel can have one or more of the following dimensions:
 an overall length in the range of 5 to 30 mm, such as 10 to 20 mm;
 a bottom width in the range of 2 to 10 mm, such as 3 to 8 mm;
 a total height in the range of 5 to 15 mm, such as 7 to 10 mm;
 a top cross-sectional width in the range of 5 to 20 mm, such as 10 to 15 mm; and
 an average opening angle in cross-section between the bottom and a top of the channel in the range of 15 to 75 deg., such as 30 to 60 deg.

Hence, by using such a channel configuration, the speed of beverage flowing along the channel can be kept more or less constant or within narrow boundaries even with significantly different beverage flow rates.

The guide outlet can have a maximum flow section that increases with a total height of the beverage above the bottom. For instance, the guide outlet has an upright entry, such as a single entry with a width that increases with height and/or an open ended entry.

The guide outlet may have one or more first sub-outlets with a low entry for allowing the passage of beverage from low height above the bottom and one or more second sub-outlets with a higher entry for allowing the passage of beverage from greater height above the bottom, such as sub-outlets that are associated with a common beverage guiding pin.

The guide outlet can have one or more third sub-outlets with an even higher entry for allowing the passage of beverage from even greater height above the bottom.

The low entry and the higher entry may be separated by a wall, the top of which guiding into the higher entry. Optionally, the higher entry, when present, is delimited by a higher top wall.

Hence, by using a guide outlet configuration of this kind, the speed of beverage flowing along the channel and/or through the guide's outlet can be kept more or less constant or within narrow boundaries even with significantly different beverage flow rates. This can be convenient when the beverage machine is configured to dispense different beverages at respective flow rates. Such outlet configuration can thus extend the speed-regulating effect provided by the guide channel.

The guide may have a draining edge for draining residual beverage or liquid to a waste collector when the guide is in the non-dispensing position.

The cavity outlet can be configured to guide the beverage or liquid away from the guide to a or the above waste collector when the guide is in the non-dispensing position.

The module can be fluidly connected to a source of liquid e.g. water, such as a machine inlet or a liquid tank, configured to supply liquid to the module for mixing such liquid with an ingredient contained in the capsule to form the beverage. For instance, the liquid source is fluidly connected to the module via a liquid driver, e.g. a pump, and/or a thermal conditioner of such liquid, e.g. a heater and/or a cooler.

Suitable liquid drivers, such as a pumps, for driving liquid, e.g. water, along a liquid line from the liquid source via the module are disclosed in WO 2006/005425, WO 2009/024500, WO 2009/150030, WO 2010/108700 and WO 2011/107574.

The liquid may be driven to the module via a conditioner such as a heater and/or a cooler. A suitable heater may be a boiler, a thermoblock or an on demand heater (ODH), for instance an ODH disclosed in EP 1 253 844, EP 1 380 243 and EP 1 809 151. Other heaters are disclosed in WO 2009/043851, WO 2009/043865, WO 2009/092746 and WO 2011/157675 and WO 2012/007260.

The machine may include a control unit for controlling the dispensing of the beverage, e.g. controlling a liquid driver and/or the thermal conditioner (when present).

The machine can comprise a user-interface (in addition to or comprising the user-interface member) for providing user-instructions to the control unit. Typically, the control unit is mounted to a machine's frame and/or housing and connected to (when present) the liquid driver, the thermal conditioner, and possibly other components such as sensor(s) (e.g. a temperature sensor or a flowmeter) and motor(s) via flexible or preferably rigid connections. Examples of control units and user-interfaces are disclosed in WO 2008/138710, WO 2009/043851, WO 2009/043865, WO 2009/092745, WO 2010/003932, WO 2010/037806, WO 2010/046442, WO 2011/020779, WO 2011/026853, WO 2011/054889, WO 2011/067156, WO 2011/067157, WO 2011/067181, WO 2011/067188, WO 2011/067191, WO 2011/067227, WO 2011/067232, WO 2011/144719, WO 2012/032019, WO 2012/072761, WO 2012/072764, WO 2012/072767 and WO 2012/093107.

For powering electric machine components, the machine may include an electric connector, such as an electric cord, for connection to the mains or other power source. Moreover, the machine may include an arrangement for storing the electric connector, such as a support for winding an electric cord.

BRIEF DESCRIPTION OF THE DRAWINGS

The invention will now be described with reference to the schematic drawings, wherein:

FIG. 2*b* is an enlarged view of part of FIG. 2;

FIG. 4 is a perspective view form above of the guide of FIGS. 2 to 3*a*;

FIG. 5 is a cross-sectional view of an outlet of the guide of FIG. 4; and FIG. 6 shows a downstream part of an alternative guide of a machine according to the invention.

DETAILED DESCRIPTION

Figure 1:
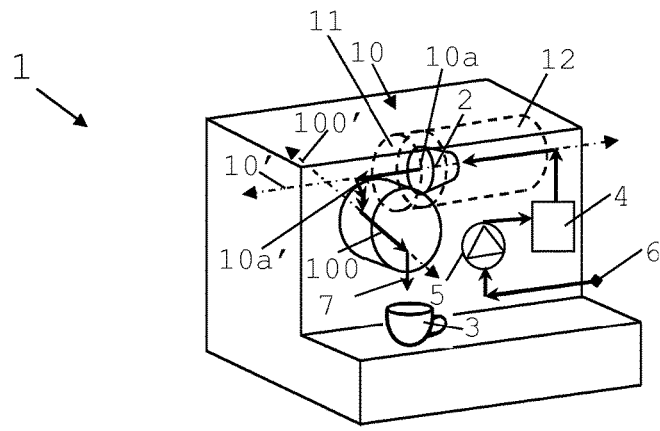
FIG. 1 is a schematic perspective view of a beverage machine according to the invention.

A beverage machine 1 according to the invention is described in FIGS. 1 to 5. A variation according to the invention is illustrated in FIG. 6.

Machine 1 has an operative orientation for dispensing a beverage 7. See FIG. 1.

Machine 1 includes a module 10 having a cavity 10*a* and a cavity outlet 10*a*' for guiding beverage 7 out of cavity 10*a*. Cavity 10*a* is delimited by a first module part 11 and a second module part 12. At least one 11 of parts 11, 12 is movable along a module direction 10' into a position distant from the other part 12 for transferring an ingredient capsule 2 to and/or from cavity 10*a* and into a position close to other part 12 for processing capsule 2 in cavity 10*a* to form beverage 7. The other part 12 may be stationary in machine 1.

Machine 1 includes a guide 100 that has a guide outlet 102 and that is movable between:

a dispensing position for receiving beverage 7 from cavity outlet 10*a*' and guiding beverage 7 along a guide direction 100' to guide outlet 102 and out thereof so as to be dispensed to a beverage dispensing area in which a user-recipient 3 can be placed for collecting beverage 7; and a non-dispensing position for preventing liquid, e.g. residual beverage or other waste liquid, from being guided out of the guide outlet (102) to the dispensing area.

Guide 100 and/or the at least one 11 of parts 11, 12 can be moved by an actuator 20, e.g. a motor, such as an actuator 20 connected to guide 100 and/or to the at least one 11 of the parts 11, 12 via a mechanical transmission 30, e.g. comprising at least one of a worm drive 31, toothed wheel 32, 34, toothed pinion 33 and cam arrangement 35, 36.

Guide direction 100' is horizontally angled away from module direction 10' when machine 1 is in its operative orientation, such as horizontally angled away by an angle in the range of 45 to 135 deg., such as 60 to 120 deg., for instance 75 to 105 deg., for example 85 to 95 deg., e.g. an angle of about 90 deg.

Module direction 10' may extend in a module vertical plane and guiding direction 100' may extend in a guide vertical plane that are at the above horizontal angle, when machine 1 is in the operative orientation.

Cavity outlet 10*a*' can have a cavity outlet direction along which beverage 7 is guided out thereof, the cavity outlet direction being at a further horizontal angle to module direction 10' when machine 1 is in the operative orientation. For instance, such further horizontal angle is equal or substantially equal to the abovementioned horizontal angle. See FIGS. 1 and 2*b*.

The at least one 11 of parts 11, 12, when moved between the distant and the close positions, may actuate guide 100 between the dispensing and the non-dispensing positions. For instance, the at least one 11 of parts 11, 12 having a part member 111, e.g. a cam, that acts between the distant and the close positions in a relatively sliding or rolling movement on guide 100 to actuate it. See FIG. 2b.

Guide 100 can have a member 104, such as a cam-follower, which is actuated to move guide 100 between the dispensing and the non-dispensing positions. See FIG. 2b.

Guide member 104 can be actuated by the at least one 11 of the parts 11, 12 when moved between the distant and the close positions. For instance, guide 104 is moved in a direction that is different to module direction 10'.

Guide 100 can be translationally and/or rotationally movable between the dispensing and the non-dispensing positions. For instance, guide 100 is pivotally mounted along a pivoting axis 103.

Guide 100 may have a guide channel 101, 101', 101", 101b extending along guide direction 100' for receiving beverage 7 from cavity outlet 10a' and guiding beverage 7 to guide outlet 102. Guide channel 101, 101', 101" may have a cross-section orthogonal to guide direction 100' and a bottom 101, 101b' generally extending along the guide direction 100', the cross-section having a width that increases with distance from bottom 101, 101b', typically with height above bottom 101, 101b'.

Guide channel 101, 101', 101", 101b may extend in a generally, symmetrical or asymmetrical, U-shape or V-shape or stepped-shape in cross-section orthogonal to guide direction 100' and along substantially the entire bottom 101, 101b' or along a predominant part thereof. See FIGS. 4 and 6.

Guide channel 101, 101', 101" can be stepped in cross-section. Bottom 101 may form a lower bottom 101 at a bottom level, guide channel 101, 101', 101" having at least one upper bottom 101', 101" at an upper level above the lower level so that guide channel 101, 101', 101" has:
  a narrow cross-section extending from above the lower level to the upper level for guiding a small flow of beverage 7 along guide channel 101, 101', 101"; and
  a wider section extending from above the upper level for guiding a greater flow of beverage 7 along guide channel 101, 101', 101", This is illustrated, by way of example, in FIG. 4.

For instance, guide channel 101, 101', 101" has a further upper bottom 101" at a further upper level above the upper level so that guide channel 101, 101', 101" has an even wider cross-section extending from above this further upper level for guiding an even greater flow of beverage 7 along guide channel 101, 101', 101".

Guide outlet 102 can have a maximum flow section that increases with a total height of beverage 7 above bottom 101, 101', 101". For instance, guide outlet 102b has an upright entry 102b', such as an entry with a width that increases with height and/or an open ended entry. See FIG. 6.

Guide outlet 102 can have one or more first sub-outlets 102' with a low entry 102a' for allowing the passage of beverage 7 from low height above bottom 101 and one or more second sub-outlets 102" with a higher entry 102a" for allowing the passage of beverage 7 from greater height above the bottom 101. For instance, sub-outlets 102', 102" are associated with a common beverage guiding pin 102a for guiding beverage at the downstream end of guide outlet 102. See FIGS. 2b and 5.

The guide outlet can have one or more third sub-outlets with an even higher entry for allowing the passage of beverage from even greater height above the bottom.

Low entry 102a' and higher entry 102a" can be separated by a wall 102''', the top of which guiding into higher entry 102a", the higher entry when present being for instance delimited by a higher top wall. See FIGS. 4 and 5.

Figure 2:
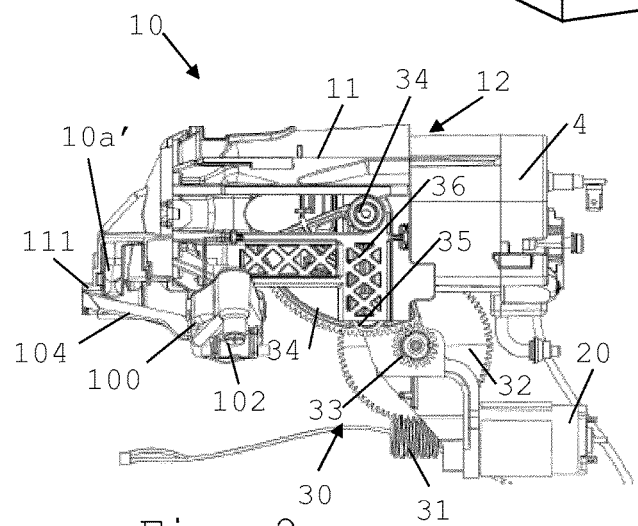
FIGS. 2 and 2*a* illustrate a module with a guide of a machine according to the invention, the guide being in a non-dispensing position.
Figure 2A:
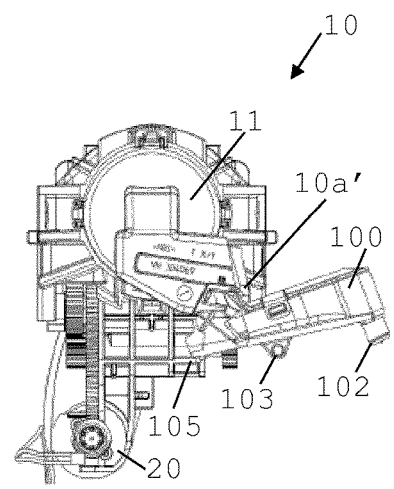
Figure 3:
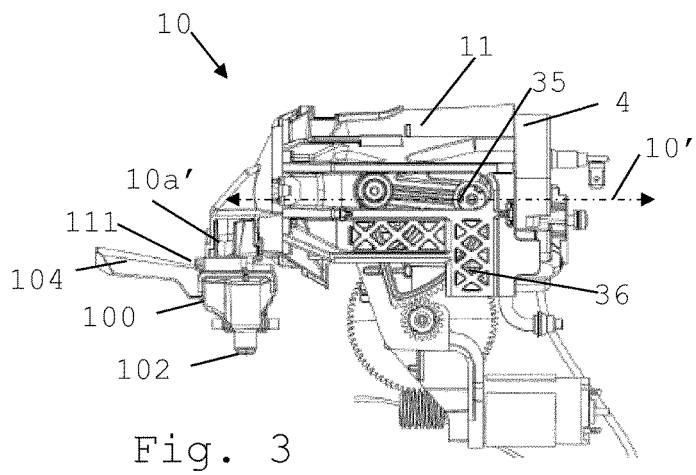
FIGS. 3 and 3*a* illustrate the module and guide of FIGS. 2 and 2*a*, the guide being in a dispensing position.
Figure 3A:
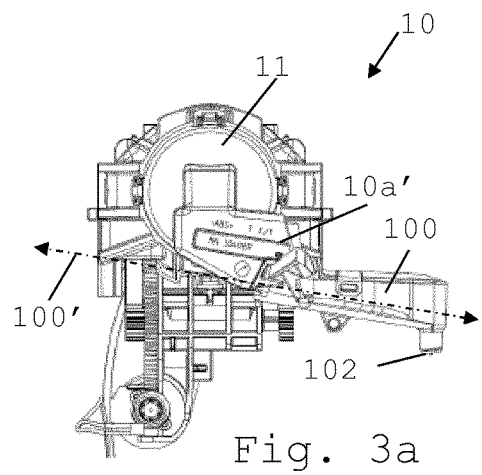

Guide 100 can have a draining edge 105 for draining residual beverage or liquid to a waste collector when the guide 100 is in the non-dispensing position. See FIGS. 2a and 4.

Cavity outlet 10a' can be configured to guide beverage 7 or liquid away from guide 100 to a or the above waste collector when guide 100 is in the non-dispensing position. See FIGS. 2 and 2b.

Module 10 can be fluidly connected to a source 6 of liquid e.g. water, such as a machine inlet or a liquid tank, configured to supply liquid to module 10 for mixing such liquid with an ingredient contained in capsule 2 to form beverage 7. For instance, liquid source 6 is fluidly connected to module 10 via a liquid driver 5, e.g. a pump, and/or a thermal conditioner 4 of such liquid, e.g. a heater and/or a cooler. See FIG. 1.

The invention claimed is:

1. A machine having an operative orientation for dispensing a beverage, the machine comprising:
  a module having a cavity and a cavity outlet configured for guiding the beverage out of the cavity, the cavity being defined by a first module part and a second module part, at least one of the first module part or the second module par being movable along a module direction into a distant position distant from an other one of the first module part or the second module part for transferring an ingredient capsule to and/or from the cavity and into a close position close to the other one of the first module part or the second module part for processing the ingredient capsule in the cavity to form the beverage, the other one of the first module part or the second module part being stationary;
  a guide that has a guide outlet, the guide being movable between:
    a dispensing position configured for receiving the beverage from the cavity outlet and guiding the beverage along a guide direction to and out of the guide outlet to be dispensed to a beverage dispensing area configured to receive a user-recipient for collecting the beverage; and
    a non-dispensing position configured for preventing liquid from being guided out of the guide outlet to the dispensing area; and
  wherein the guide direction is at a horizontal angled to the module direction when the machine is the operative orientation.

2. The machine of claim 1, wherein, when the machine is in the operative orientation the module direction extends in a module vertical plane and the guiding direction extends in a guide vertical plane that are at the horizontal angle.

3. The machine of claim 1, wherein, when the machine is in the operative orientation, the cavity outlet has a cavity outlet direction, the beverage being guided along the cavity outlet direction and out of the cavity outlet, the cavity outlet direction being at another horizontal angle to the module direction.

4. The machine of claim 1, wherein the at least one of the first module part or the second module part, when moved between the distant position and the close position, actuates the guide between the dispensing position and the non-dispensing position.

5. The machine of claim 1, wherein the guide has a member configured to be actuated to move the guide between the dispensing position and the non-dispensing position.

6. The machine of claim 5, wherein the guide member is actuated by the at least one of the first module part or the second module part when moved between the distant position and the close position.

7. The machine of claim 1, wherein the guide is rotationally movable between the dispensing position and the non-dispensing position.

8. The machine of claim 1, wherein the guide has a guide channel extending along the guide direction, the guide configured for receiving the beverage from the cavity outlet and guiding the beverage to the guide outlet, the guide channel having a cross-section orthogonal to the guide direction and a bottom extending along the guide direction, the cross-section having a width that increases with distance from the bottom.

9. The machine of claim 1, wherein the guide channel extends in an asymmetrical, U-shape, V-shape, or stepped-shape in the guide direction along the bottom.

10. The machine of claim 1, wherein the guide outlet has a maximum flow section having a width that increases with a total height of the beverage above the bottom.

11. The machine of claim 1, wherein the guide has a draining edge for draining a residual beverage to a waste collector when the guide is in the non-dispensing position.

12. The machine of claim 1, wherein the cavity outlet is configured to guide the beverage away from the guide to a waste collector when the guide is in the non-dispensing position.

13. The machine of claim 1, wherein the module is fluidly connected to a source of liquid that is configured to supply the liquid to the module for mixing the liquid with an ingredient contained in the ingredient capsule to form the beverage.

14. A machine having an operative orientation for dispensing a beverage, the machine comprising:
 a module having a cavity and a cavity outlet configured for guiding the beverage out of the cavity, the cavity being defined by a first module part and a second module part, at least one of the first module part or the second module part being movable along a module direction into a distant position distant from an other one of the first module part or the second module part for transferring an ingredient capsule to and/or from the cavity and into a close position close to the other one of the first module part or the second module part for processing the ingredient capsule in the cavity to form the beverage, the other one of the first module part or the second module part being stationary;
 a guide that has a guide outlet, the guide being movable between:
  a dispensing position configured for receiving the beverage from the cavity outlet and guiding the beverage along a guide direction to and out of the guide outlet to be dispensed to a beverage dispensing area configured to receive a user-recipient for collecting the beverage; and
  a non-dispensing position configured for preventing liquid from being guided out of the guide outlet to the dispensing area; and
 wherein the guide direction is at a horizontal angle to the module direction when the machine is the operative orientation;
 wherein the guide has a guide channel extending along the guide direction, the guide configured for receiving the beverage from the cavity outlet and guiding the beverage to the guide outlet, the guide channel having a cross-section orthogonal to the guide direction and a bottom extending along the guide direction, the cross-section having a width that increases with distance from the bottom,
 wherein the guide channel extends in a stepped-shape in the cross-section, and wherein the bottom forms a lower bottom at a lower level, the guide channel having at least one upper bottom at an upper level above the lower level, and the guide channel has:
  a narrow cross-section extending from above the lower level to the upper level for guiding a small flow of the beverage along the guide channel; and
  a wider section extending from above the upper level for guiding a greater flow of the beverage along the guide channel.

15. A machine having an operative orientation for dispensing a beverage, the machine comprising:
 a module having a cavity and a cavity outlet configured for guiding the beverage out of the cavity, the cavity being defined by a first module part and a second module part, at least one of the first module part or the second module part being movable along a module direction into a distant position distant from an other one of the first module part or the second module part for transferring an ingredient capsule to and/or from the cavity and into a close position close to the other one of the first module part or the second module part for processing the ingredient capsule in the cavity to form the beverage, the other one of the first module part or the second module part being stationary;
 a guide that has a guide outlet, the guide being movable between:
  a dispensing position configured for receiving the beverage from the cavity outlet and guiding the beverage along a guide direction to and out of the guide outlet to be dispensed to a beverage dispensing area configured to receive a user-recipient for collecting the beverage; and
  a non-dispensing position configured for preventing liquid from being guided out of the guide outlet to the dispensing area; and
 wherein the guide direction is at a horizontal angle to the module direction when the machine is the operative orientation;
 wherein the guide has a guide channel extending along the guide direction, the guide configured for receiving the beverage from the cavity outlet and guiding the beverage to the guide outlet, the guide channel having a cross-section orthogonal to the guide direction and a bottom extending along the guide direction, the cross-section having a width that increases with distance from the bottom;
 wherein the guide outlet has a maximum flow section having a width that increases with height of the beverage above the bottom,
 wherein the guide outlet has one or more first sub-outlets, each first sub-outlet having a lower entry configured for allowing the passage of the beverage from a lower height above the bottom, and one or more second sub-outlets, each second sub-outlet having a higher entry configured for allowing the passage of the beverage from a greater height above the bottom.

* * * * *